United States Patent

[11] 3,622,147

| [72] | Inventor | Henry R. Mebus<br>Nazareth, Pa. |
|---|---|---|
| [21] | Appl. No. | 834,322 |
| [22] | Filed | June 18, 1969 |
| [45] | Patented | Nov. 23, 1971 |
| [73] | Assignee | Harris-Intertype Corp.<br>Cleveland, Ohio |

[54] BOOK-CALIPERING MACHINE
27 Claims, 6 Drawing Figs.

[52] U.S. Cl. .................................................. 270/54,
271/56
[51] Int. Cl. ...................................................... B65h 39/02
[50] Field of Search ........................................... 270/54, 55,
56, 58, 12–15, 45–51; 271/47, 56, 57

[56] References Cited
UNITED STATES PATENTS

| 1,738,180 | 12/1929 | Frazier .......................... | 270/56 |
| 2,556,895 | 6/1951 | Baker ............................ | 271/47 |
| 3,007,697 | 11/1961 | Mosemiller ................... | 271/56 |
| 3,191,925 | 6/1965 | McCain ......................... | 270/56 |

*Primary Examiner*—Robert W. Michell
*Assistant Examiner*—L. R. Oremland
*Attorney*—Yount & Tarolli ABSTRACT: The disclosure relates to a calipering machine for detecting the absence of a predetermined number of gathered signatures. The machine includes a driven calipering wheel and an idler calipering wheel. The driven calipering wheel is movably mounted on the machine frame for movement relative thereto independently of movement of the idler calipering wheel. The idler calipering wheel is supported on a first lever which is pivotable with respect to the calipering machine frame and independent of movement of the driven calipering wheel. A second lever located adjacent the first lever is movable in response to movement of the idler calipering wheel relative to the calipering machine frame. Located on an end of the second lever is a gauge block while a pair of gauge block receptacles are located on a third lever which is cyclically movable towards and away from the gauge block. The gauge block is adapted to pass between the gauge block receptacles as long as the predetermined number of signatures form between the calipering wheels. A switch-actuating mechanism located on the third lever is arranged to actuate a switch whenever interference occurs between the gauge block receptacles and the gauge block as a result of the passage of an incorrect number of signatures between the calipering wheels. Apparatus is also disclosed for recording information pertaining to a detected incorrect number of signatures in order that such information can be used to provide at least one signal that will insure that the group of, or incorrect number of, signatures will not be assembled into a book or magazine.

PATENTED NOV 23 1971

INVENTOR.
HENRY R. MEBUS
BY
Kenyon & Kenyon
ATTORNEYS

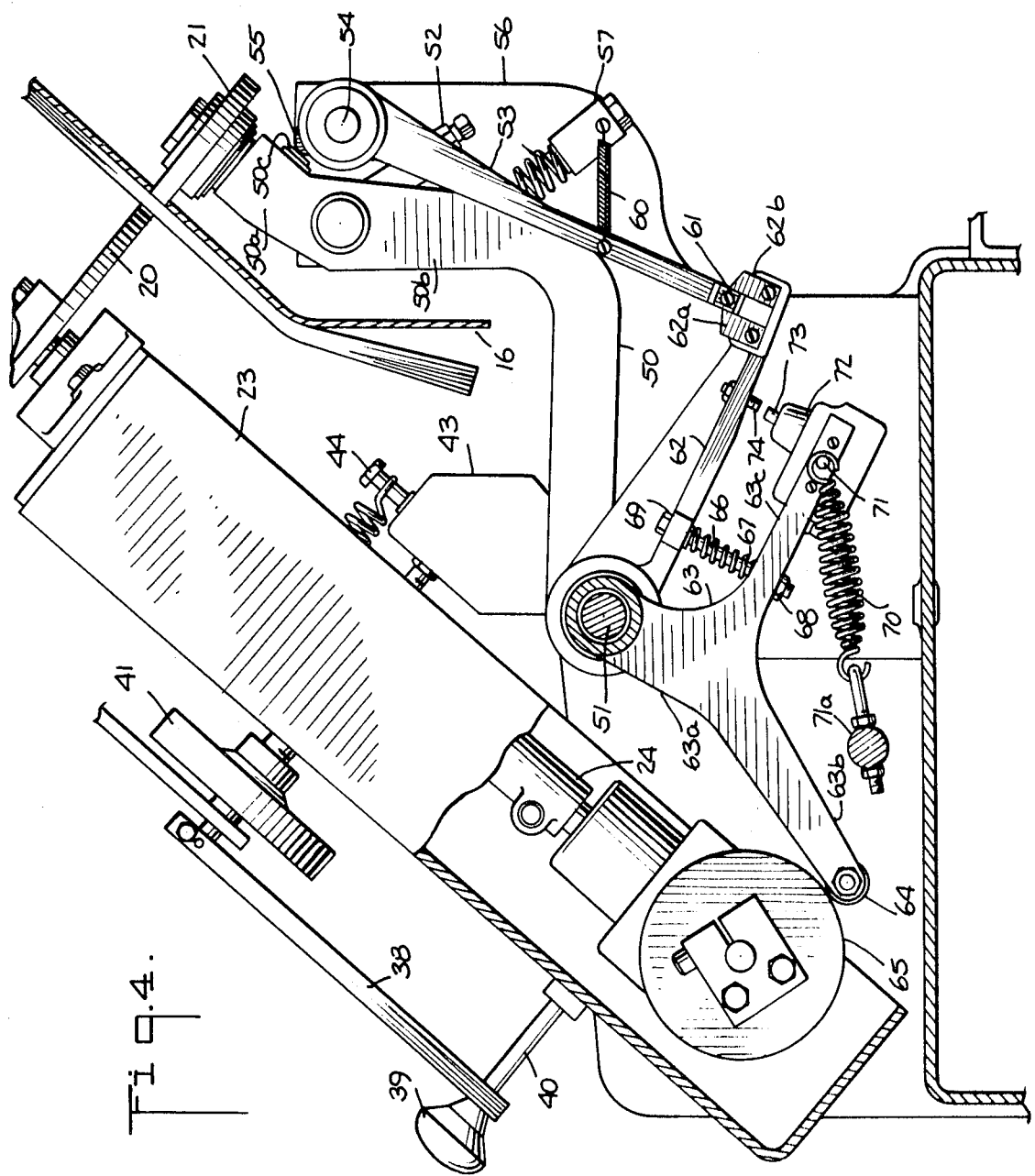

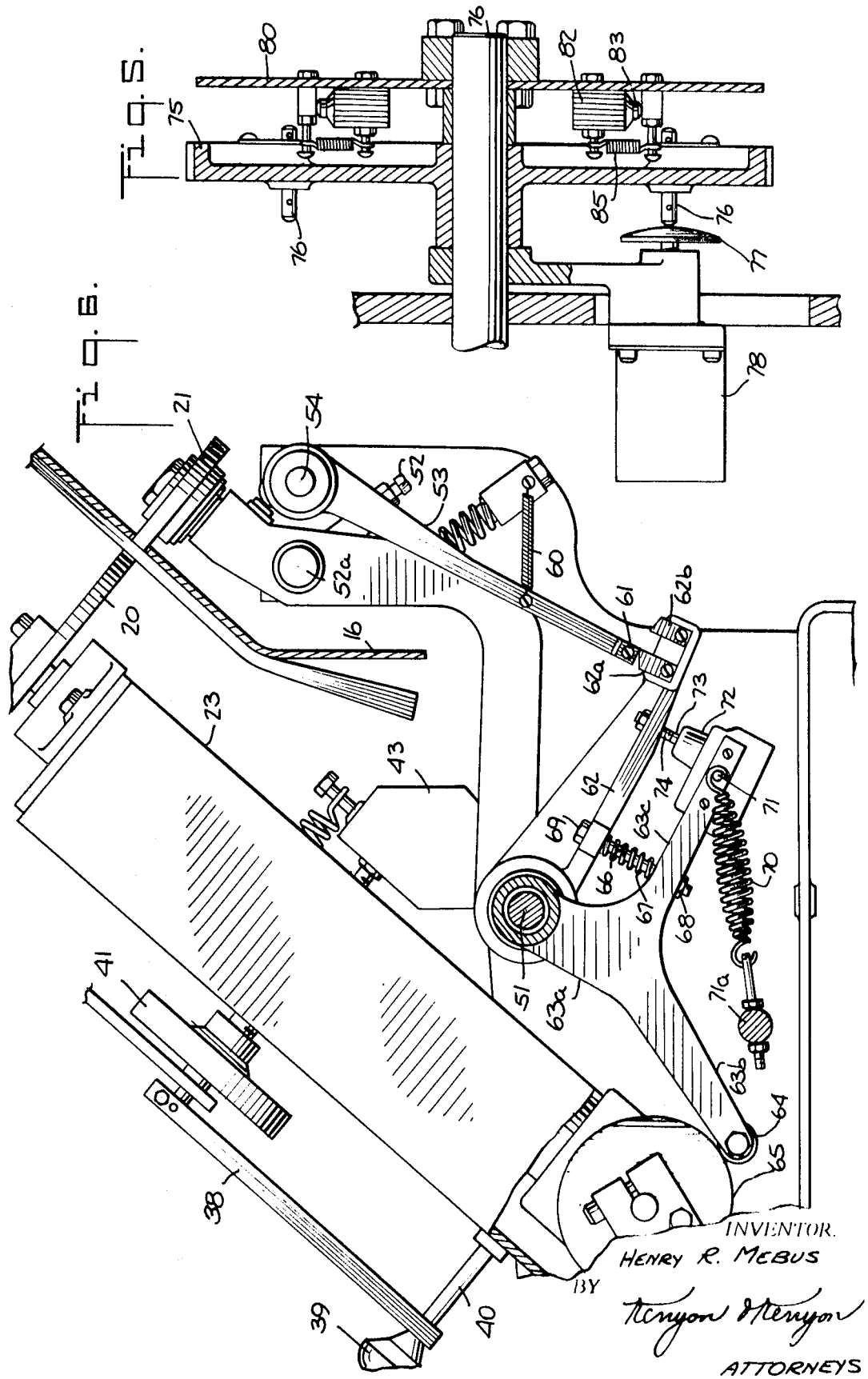

BOOK-CALIPERING MACHINE

FIELD OF THE INVENTION

This invention relates to apparatus for calipering groups of signatures preparatory to the signatures being assembled into a book or magazine and in particular to apparatus that can simply and accurately detect the absence of a predetermined number of signatures in a group of signatures.

Books and magazines (hereinafter generically referred to as books) are generally made by gathering and joining together a plurality of different signatures that are to comprise the book. In order to insure that the correct number of signatures have been gathered, it is necessary to measure the thickness of the gathered signatures, i.e., to caliper the signatures, in order to insure that none are missing or that two or more of the same signature have not been gathered.

DESCRIPTION OF THE PRIOR ART

There have been a number of prior art machines designed expressly to caliper gathered signatures. Many of the prior art calipering machines are extremely complicated and difficult to use. A specific drawback of many of the prior art calipering machines is that once they had been set to detect the absence of a predetermined number of signatures in a group of signatures, it is extremely difficult and time consuming to change the calipering machine setting to detect the absence of a different predetermined number of signatures. The reason for this is that the mechanical linkage for sensing and magnifying the variations in caliper of the gathered signatures generally contains sufficient lost motion which prevents a simple and predictable change in setting of the calipering machine. Instead, a "cut and try" approach is normally employed in setting the machine to respond to a departure from a predetermined number of signatures.

For example, if the group of signatures contains more than a predetermined number of signatures, as determined by the distance between the calipering wheels, the idler wheel moves away from the driven calipering wheel and vice versa. In these prior art calipering machines the idler calipering wheel is connected to the machine frame by extensive and complicated linkage. When it is necessary to detect a different number of signatures, it is necessary to stop operation of the machine and adjust the position of the idler calipering wheel relative to the driven calipering wheel and then adjust both the driven and idler calipering wheels relative to the plane through which the signatures pass as they advance through the machine along the saddle (see for example U.S. Pat. No. 2,999,242). This adjustment is usually difficult to achieve and time consuming and therefore can cause a long delay before the gatherer can be restored to operation. Such a delay can be costly since it results in the machine not being productive while the fixed overhead charges associated therewith continue. The ensuing delay is undesirable as it impairs the rapid assembly of books, something that can have deleterious side effects when deadlines, etc. have to be met.

Once an incorrect number of signatures has been detected, be to too few or too many signatures, it is then necessary for this information to be used in order that the gathered signatures are not assembled to form a book having an incorrect number of pages.

SUMMARY OF THE INVENTION

It is thus apparent that if a calipering machine can be designed to overcome each of the aforementioned difficulties associated with prior art calipering devices, it would find widespread use. If the calipering machine can also provide a memory for storing information relating to a sensed incorrect number of signatures, the stored information can be used to monitor the subsequent binding operations normally performed on groups of signatures in order to insure that these operations will not be performed on the group having the incorrect number of signatures.

It is therefore an object of the present invention to provide an improved calipering machine for detecting whether a group of signatures is constituted by a predetermined number of signatures.

A further object of the present invention is to provide a calipering machine which can be simply and rapidly adjusted to detect the absence of any selected number of signatures in a group of signatures.

Another object of the present invention is to provide a calipering machine that is accurate in operation and simple in structure.

A further object of the present invention is to provide a calipering machine capable of achieving each of the foregoing objects and capable of storing information relating to a detected incorrect number of signatures in a group of signatures wherein this information can be utilized to provide at least one signal that can be used to insure that the group containing the incorrect number of signatures will not be assembled into a completed book.

Briefly, in accordance with the present invention, the foregoing and other objects are accomplished by a machine in which the group of signatures that are to be calipered are passed between a driven calipering wheel and an idler calipering wheel. The driven calipering wheel is adjustably mounted on the machine frame for movement relative to the idler calipering wheel independent of the movement of the idler calipering wheel.

The idler calipering wheel is rotatably supported on a first lever which is pivotable independent of movement by the driven wheel with respect to the machine frame so as to pivot about on axis substantially parallel to the path of travel of the signatures passing between the calipering wheels. A second lever is located adjacent the first lever and is movable in conjunction with movement of the idler calipering wheel and said first lever. Located on an end of the second lever is a gauge block. A pair of gauge block receptacles are located on a third lever which is cyclically movable towards and away from the gauge block. A switch-actuating mechanism is located on the third lever and arranged to actuate a switch upon interference between the gauge block receptacles and the gauge block.

The group of signatures to be calipered are passed between the driven and idler calipering wheels. If the number of signatures passing between these wheels is more than a predetermined or desired number, the idler wheel moves away from the driven wheel, thereby causing the first lever to move in a first direction. Movement of the first lever in the first direction will cause the second lever to move in a second direction with the gauge block thereon also moving in the second direction. As the gauge block receptacles are moved towards the gauge block, they abut the gauge block which has been moved to an interfering position with respect to the path of travel of the gauge block receptacles as a result of there being detected more than the predetermined number of signatures in the group of signatures. The interference between the gauge block and the gauge block receptacles impedes further movement of the gauge receptacles. As a result the third lever causes a switch to be actuated to indicate the calipering of an incorrect number of signatures in a group of signatures.

Actuation of the switch causes a memory device to store information pertaining to the calipered incorrect number of signatures so this information can be used to provide at least one signal that will insure that the group of signatures will not be assembled into a book.

BRIEF DESCRIPTION OF THE DRAWINGS

Other objects, aspects and features of the present invention will be apparent from the following specification and drawings in which:

FIG. 4 is a vertical section view taken along the lines 4—4 of FIG. 3 showing the linkage where the correct number of signatures are at the caliper wheels;

FIG. 5 is a vertical section view taken along line 5—5 in FIG. 2 and showing the electromechanical memory arrangement;

FIG. 6 is a fragmentary vertical section view taken along the line 6—6 in FIG. 3 and showing the linkage when an incorrect number of signatures are at the calipering wheels.

BRIEF DESCRIPTION OF THE PREFERRED EMBODIMENT

Figure 1:
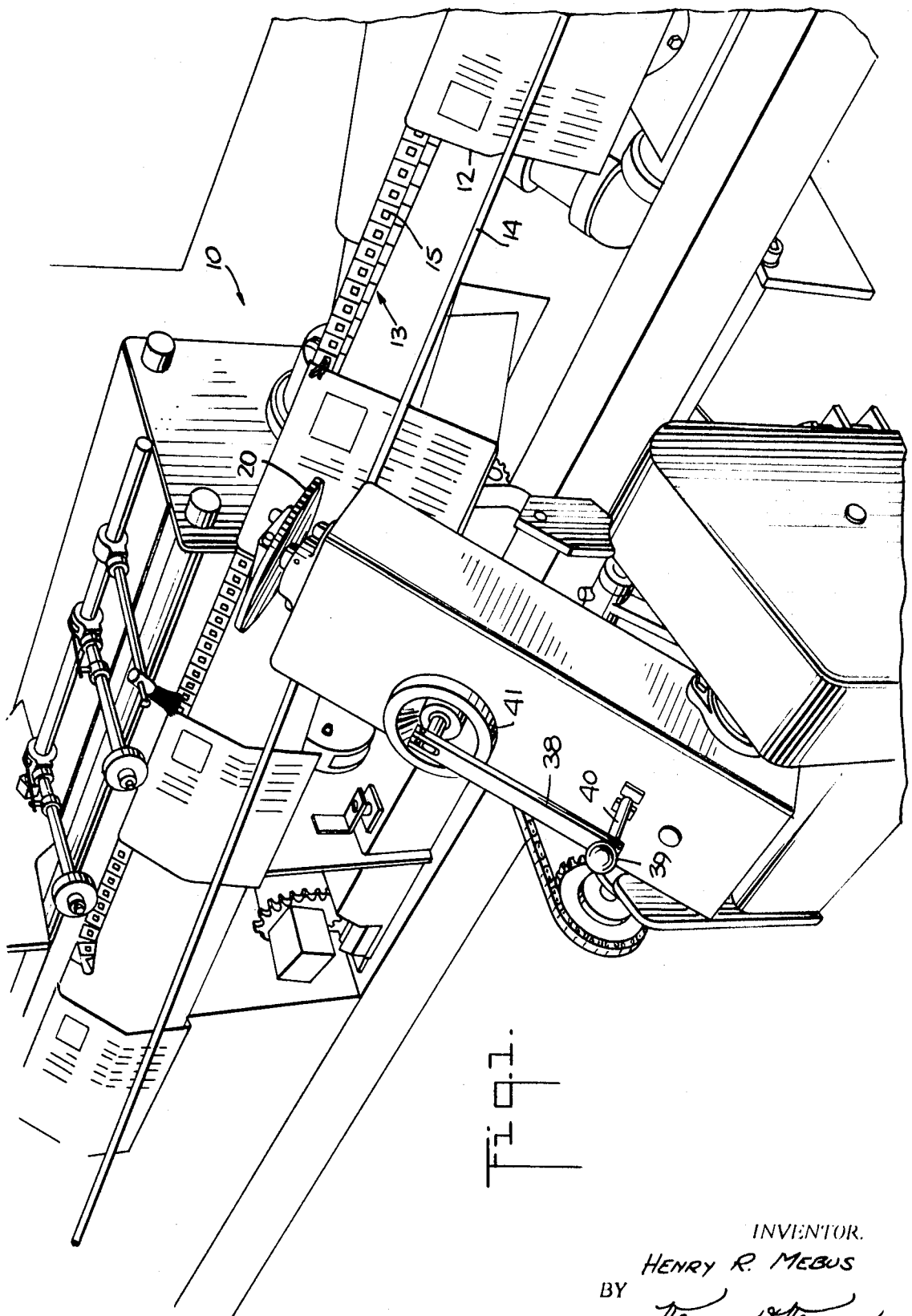
FIG. 1 is a perspective view of a signature gatherer utilizing an embodiment of the present invention.
Figure 2:
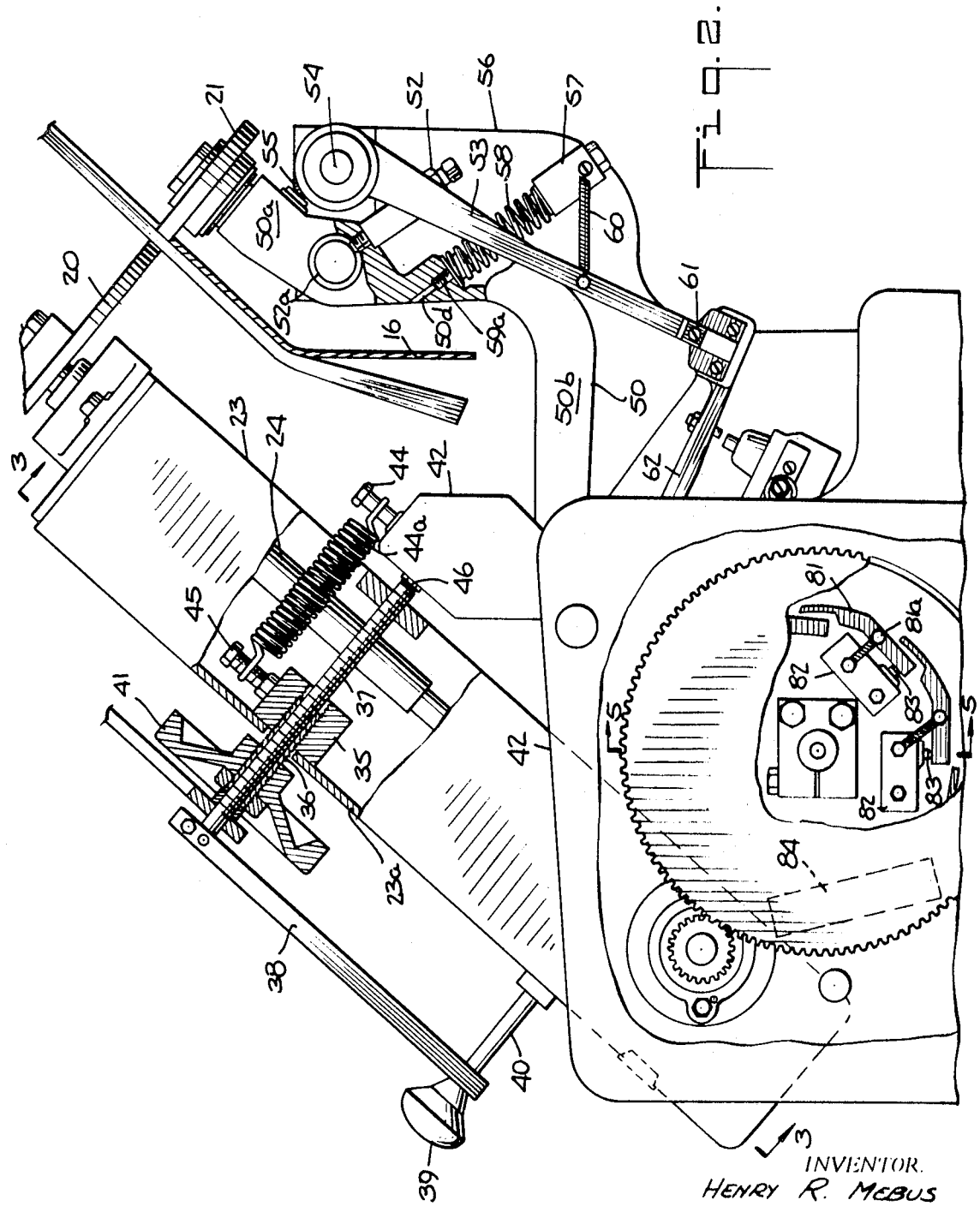
FIG. 2 is a fragmentary vertical section view showing the calipering wheels and the adjuster means therefor.

Referring now to the drawings and more particularly to FIG. 1 wherein a signature gatherer 10 is seen to include a saddle 11 upon which the signatures 12 to be calipered and assembled into the completed book are placed after having been gathered. Saddle 11 includes an upper supporting guide 13 and lateral signature support guides 14 which is only shown in FIG. 1. Located on upper support guide 13 are a series of connected movable elements or chairs 15 which moves along upper support guide 13 to advance the signatures that are placed thereon through machine 10. The side portion of the signatures being calipered rest on a plate 16 as seen in FIG. 2.

The calipering portion of machine 10 will now be described in detail as it is this portion of machine 10 that the present invention is directed.

Figure 3:
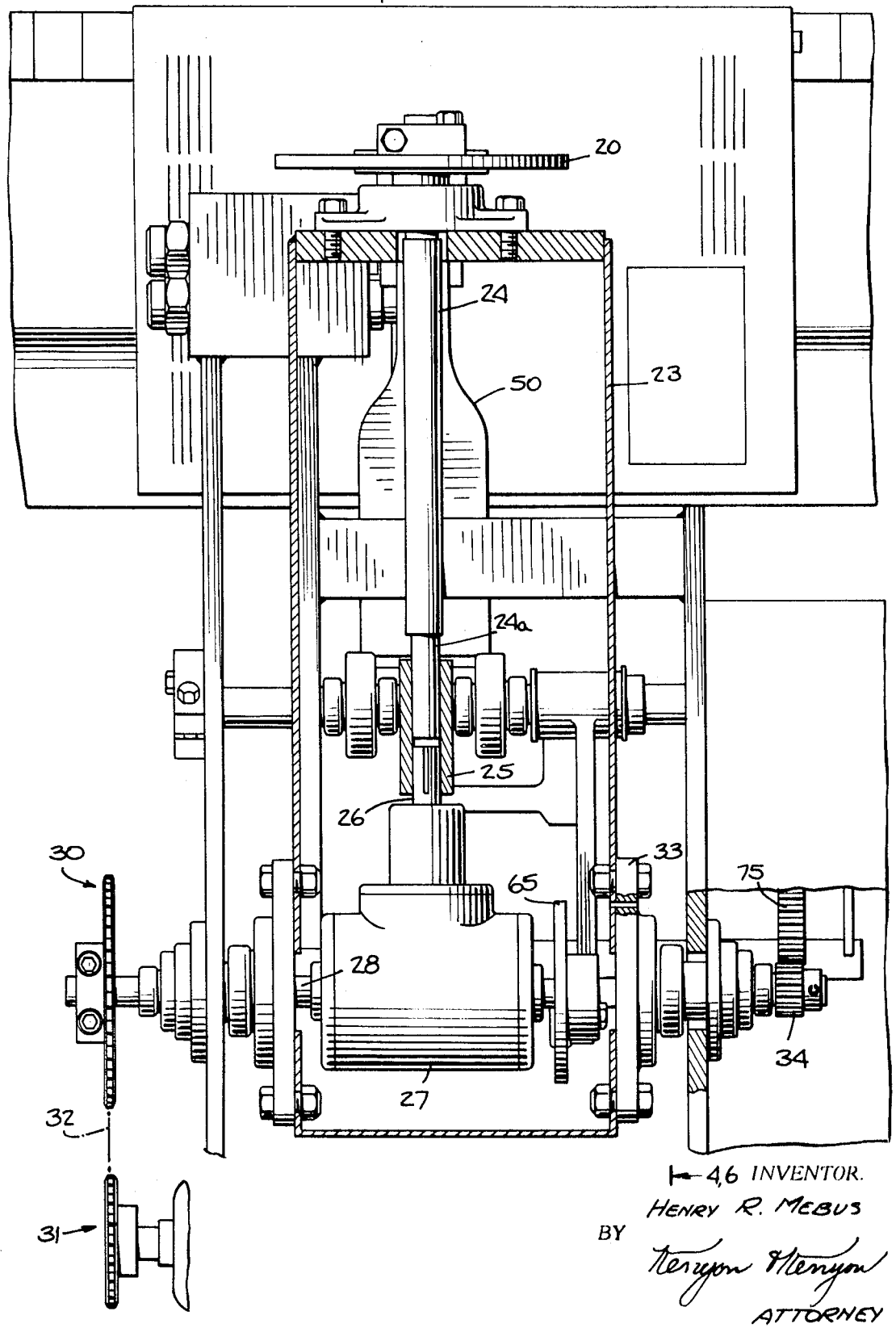
FIG. 3 is an inclined section view taken along the lines 3—3 in FIG. 1 and showing the drive to the driven calipering wheel.

In FIGS. 1, 2, 3, 4 and 6 of the drawings an adjustable driven calipering wheel 20 is seen to be spaced a short distance from an idler calipering wheel 21, the manner of adjusting the distance between these calipering wheels to be hereinafter explained. Driven wheel 20 is mounted outside of housing 23 and driven by shaft 24 which extends from the wheel to a stepped portion 24a within the housing, the stepped portion being connected to a rigid joint 25 (FIG. 3). While a particular type of rigid joint 25 is schematically shown it is of course to be understood that any conventional type arrangement for coupling two shafts together can be used without departing from the scope of the present invention.

Shaft 26 is connected to joint 25 at one end and at its other end to a right-angle gear box 27 from which shaft 28 projects. One portion of shaft 28 projects through plate 29, which is fastened to housing 23, to sprocket 30 which is rotated by driving sprocket 31 via chain linkage 32 (schematically shown) between driving sprocket 31 and driven sprocket 30. Driving sprocket 31 is powered by a connection to the drive of the gatherer or binder in order to maintain the calipering machine in synchronism therewith. The other end portion of shaft 28 rotates a cam 65 and also extends through plate 33 to a pinion gear 34 to drive the gear by being keyed thereto or by any of the fastening means available to a skilled mechanic.

Normally, driving sprocket 31 by means of chain 32 rotates driven sprocket 30 which rotates shaft 28, cam 65 and pinion gear 34. Rotation of shaft 28 causes right-angle gear box 27 to rotate shaft 26 and by means of joint 25, rotate shaft 24 and calipering wheel 20. Shafts 24 and 26 can be rotated about an axis passing through shaft 28 for a reason to be apparent.

Attached to the enclosed portion of side 23a of housing 23 is a block 35 (FIG. 2) having a central threaded opening in which is mounted threaded sleeve 36. A threaded shaft 37 is in turn located within sleeve 36 in mating engagement therewith with the threads on shaft 37 being much coarser than the threads on sleeve 36.

The sleeve and shaft arrangement just described are conventional with rotation of the shaft providing substantial longitudinal movement of the shaft along its length relative to block 35 whereas rotation of sleeve 36 will provide relatively little movement of the sleeve and shaft 37 relative to block 35. Rotation of shaft 37 is affected through arm 38 and knob 39, the free end of knob 39 receiving a post 40 which is engageable in an opening on the top portion of side 23a of cover plate 23. A sleeve turning wheel 41 is positioned adjacent the exposed portion of side 23a of cover plate 23 for effecting rotation of sleeve 36.

Attached to frame 42 of machine 10 is a support 43. A bolt 44 projects from support 43 and is parallel to shaft 24 and parallel to a bolt 45 which projects from block 35. A relatively strong spring 44a is attached at its ends to bolts 44 and 45, respectively. Located on support 43 is a stud stop 46 which is in alignment with stud 37.

Spring 44a, which is fixed relative to the machine frame by support 43, biases bolt 45, block 35 and hence cover plate 23 and wheel 20 towards wheel 21 until the free end of shaft 37 is in contact with stop 46. By adjusting the position of shaft 37 relative to block 35 by movement of arm 38 and/or wheel 41 it is possible to pivot housing 23 and hence move shaft 24 and driven calipering wheel 20 relative to idler calipering wheel 21. In this way, the calipering mechanism is adjusted to detect different specified numbers of signatures, the distance between the calipering wheels corresponding to the thickness of the specified number of signatures. It is thus readily apparent that driven calipering wheel 20 can be moved relative to idler calipering wheel 21 quite easily and rapidly and without the need for extensive and expensive machine downtime. It is to be noted that the mechanism for adjusting the distance between the respective calipering wheels is extremely effective and efficient, yet it does not involve the complicated linkage heretofore required to perform this function.

Idler caliper wheel 21 is supported by lever 50 which may pivot about a fixed pivot point 51 (FIG. 4). Lever 50 is generally L-shaped with portion 50a of the lever being inclined with respect to the portion 50b which is adjacent thereto. Located on the underside portion 50a of lever 50 is an abutment surface 50c for a reason soon to be apparent. An adjustable screw 52 is threaded to lever 50 to control the counterclockwise extent of rotation thereto (viewed in FIG. 2) by its cooperation with stop 52a, the latter being fixed to machine frame 56 as will hereinafter be apparent (FIG. 2). Another lever 53 is positioned adjacent lever 50 and is pivotable about a pivot point 54 which is fixed relative to frame 42 by member 56. Spherical portion 55 is located at the upper most portion of lever 53 and is in contact with abutment surface 50c. Also attached to the machine frame is a spring support 57 against which one end of compression spring 58 rests. The other end of spring 58 receives a plug member 59 which has a projecting portion 59a which is received in an aperture 50d within lever 50. Spring 58 biases lever 50 in a counterclockwise direction as viewed in FIG. 2 so that screw 52 abuts stop 52a. Attached to spring support 57 is one end of a spring 60, the other end of which is attached to the approximate midportion of lever 53. Located at the free end of lever 53 is a gauge block 61 which may comprise a piece of accurately machined material.

Positioned at substantially right angles to lever 53 is a lever 62 which is pivotable at one end about pivot point 51 (FIG. 4). Located at the free end of lever 62 are a pair of gauge block receptacles 62a and 62b. The distance between the receptacles is slightly greater than the thickness of gauge block 61 for a reason soon to be apparent. A Y-shaped element 63 having three arms 63a, 63b and 63c is located adjacent lever 61. The end of arm 63a is pivotably fixed to pivot point 51 and roller follower 64 is located at the end of arm 63b. Follower 64 is in contact with a cam 65, the latter being driven by shaft 28 (FIG. 3) from the gatherer or binder. Cam 65 has a high and low portion so that upon a complete revolution thereof, follower 64 alternately is urged away from and towards the center of rotation of the cam. Attached to third arm 63c of element 63 and to lever 62 is a bolt 66 which serves as a guide for spring 67. Located at the ends of bolt 66 and flanking arm 63c and lever 62, respectively, are nuts 68 and 69. Normally spring 67 will urge lever 62 away from arm 63c to a limit position determined by bolt 66.

A spring 70 has one free end looped about a post 71 projecting from the free end of arm 63c with the other end of the spring being attached to the machine frame by a fastening attachment 71a. Located on the free end of arm 63c and adjacent to post 71 is a switch 72 which includes a post 73. The contact position of switch 72 can be changed to an actuating condition upon post 73 being depressed. A switch-actuating element 74 is fastened to lever 62 and is positioned on lever 62 so that when lever 62 and arm 63a are moved towards each other, element 74 will depress post 73 to change the switching conditions in switch 72 and (FIG. 4) energize a solenoid 78 (FIG. 5).

Upon the calipering apparatus of the present invention calipering an incorrect number of signatures it is necessary for this information to be utilized to insure that the group of incorrect signatures are not assembled into a book. To perform this function the present invention includes a gear 75 (FIG. 5) which is rotatable about shaft 76 which is fixed relative to machine frame 42 and in mesh with pinion gear 34 (FIG. 3). Symmetrically located about an annular section of gear 75 are a set of pins 76 which can slide through the interior of gear 75 in a manner hereinafter described (FIG. 5). The ratio of gear 75 to pinion 34 determines the number of pins on the face of gear 75. If the gear to pinion ratio is 8:1, eight pins are provided on gear 75, etc. The reason for this arrangement is to insure that the time it takes for one pin to reach a position previously occupied by an adjacent pin will represent one cycle or rotation of shafts 28 and 24. It is of course to be appreciated that the gear to pinion ratio and hence the number of pins located on gear 75 can be varied as desired without departing from the scope of the invention.

Located adjacent the ends of pins 76 is a plunger 77. Plunger 77 will normally be in the position seen in FIG. 5, i.e., spaced from the path of travel of the free ends of pins 76 which extend towards the plunger. However, upon energization of solenoid 78 by switch 71 being actuated (FIG. 6), plunger 77 (FIG. 5) will be in the path of travel of the free ends of pins 76 as gear 75 rotates.

A stationary disc 80 which is positioned parallel to gear 75 has located thereon a plurality of levers 81 which are pivotable about a pivot point 81a at the approximate midpoint of the levers (FIG. 2). The levers are adapted to be pivoted whenever one of pins 76 which has been advanced by plunger 77 engages ramp portion 81b of any lever. Located adjacent each lever is a switch 82 having an actuating button 83. Spring 85 biases lever 81 against button 83. Whenever a lever is moved to release the depressed button, the switch is actuated. Located in the path of travel of the ends of pins 76 which are adjacent disc 80 is an inclined block 84 which serves to return all the pins that have been pushed to the right of gear 75 by plunger 77 (as viewed in (FIG. 5) to the left of gear 75 or, as will be hereinafter be apparent, to their normal position.

Actuation of switches 82 occurs only upon the detecting of an incorrect number of signatures and the switches can be used to actuate reject apparatus in machine 10 which moves the incorrect group of signatures, subsequent to their being calipered but before they reach the binding and other operation stations, to a reject location so they will not be passed through the machine to be assembled into a magazine.

Switches 82 can also be used to insure that the binding and other operations that normally are done on a group of signatures of the specified number are not performed at the stations where the rejected signatures normally would be but for their being moved to the reject location. A delay can be built in the memory system so that the first of switches 82 to be actuated by the depressed pins and which might control the reject mechanism is not actuated while the signatures are just finishing being calipered but is actuated when the signatures are at the reject apparatus, a short period of time being necessary for the signatures to reach the reject apparatus from the calipering wheels. This delay can be achieved by placing the lever and switch arrangement controlling the reject apparatus at varying degrees of rotation past the position of plunger 77. The same delay can be built into the system for the switches which control the binding and other operations so these switches will not be actuated to stop their related operations until the time has elapsed which would normally bring the group of signatures having the incorrect number of signatures to the various stations controlled by these switches. This arrangement insures that the binding and other operations will not be interrupted while a group of the correct number of signatures are at the different operation stations; however it insures that such operations will not be performed during the time interval when the rejected signatures would be at these stations.

The structure that is utilized to bind a group of signatures after they have been calipered is not explained herein in detail as this structure does not form a part of the present invention; however, it is noted that machine 10 assembles the signatures into a completed book by binding the signatures together. The groups of signatures containing an incorrect number of signatures are removed from the machine so as not to be bound into a book having the incorrect number of pages as previously described.

Normally, idler wheel 21 is adjusted relative to plate 16 at the factory so as to project slightly through the plate. After this adjustment has been made the idler wheel never has to again be adjusted as all changes in the caliper setting are made solely by moving driven wheel 20 which requires a minimum amount of time. This is a great advance over those prior art machines that required the idler wheel to be adjusted every time the setting of the machine was changed which involved substantial amounts of "make-ready" time.

At the place of intended use of the calipering apparatus is adjusted for a specified number of signatures by placing the signatures between the calipering wheels, adjusting the position of wheel 20 relative to wheel 21, as previously described, so that gauge block 61 is flanked by receptacles 62a and 62b when lever 62 is urged towards lever 53 with the result that its projection beyond the face of plate leadpoint to the signature is reduced. As a result screw 52 is clear of stop 52a and thus the idler wheel can move slightly toward wheel 20 when a group of signatures of insufficient caliper arrives. Of course with no signatures between the wheels, screw 52 limits the inward travel of wheel 21. During the adjustment of wheel 20, wheel 21 is moved slightly to the right as viewed in FIG. 2. Normally spring 58 will bias lever 50 in a counterclockwise direction until stop 52 abuts stop 52a (FIG. 6). The initial step of adjusting idler wheel 21 relative to plate 16 can be made by adjusting screw mechanism 52 to insure that the idler wheel will project sufficiently through an opening in plate 16 (FIG. 2) to extend just beyond the surface of the plate and into engagement with the signatures resting on the plate. Thus a group of signatures having the specified number of signatures is passed between adjustable driven calipering wheel 20 and idler calipering wheel 21, wheel 21 will be moved slightly away from wheel 20 since the distance between these wheels after such slight movement corresponds to the thickness of the group of the group of the specified number of signatures. Thus with the correct group of signatures, lever 50 will pivot slightly about its pivot point 54 and lever 53 and gauge block 61 will swing slightly in a clockwise direction.

Thus to align with receptacles 62a and 62b prior to the signatures being calipered cam 65 will have been rotating with the high portion of the cam in contact with follower 64 during calipering of the signatures. Contact between follower 64 and the high portion of cam 65 causes element 63 to rotate in a counterclockwise direction, causing spring 67 to move lever 62 also in a counterclockwise direction, so that gauge block 61 is now flanked by gauge receptacles 62a and 62b (FIG. 2). This will allow lever 62 and actuating button 73, which is carried thereby, to continue their movement in an upward direction since the gauge block is received between the gauge receptacles so as not to impede counterclockwise motion of lever 62. Continued movement of lever 62 and arm 63b of lever 63 will insure that stud 74 will not actuate switch 72. As the signatures finish passing through the calipering wheels, the cam upon continuing to be rotated has its low portion in contact with follower wheel 64. As a result lever 63 under the bias of spring 70 will rotate in a clockwise direction causing bolt 66 and nuts 68 and 69 to move lever 62 also in a clockwise direction. Lever 62 cannot move close enough to arm 63b of lever 63 to enable stud 74 on lever 62 to actuate switch 72 due to the bias of spring 67 which maintains lever 62 and arm 63b the maximum distance apart from each other as determined by the distance between nuts 68 and 69. The group of signatures then leave the calipering wheels due to the movement of elements 15.

Another group of signatures by movement of element 15 and calipering wheel 20 then passes between calipering wheels 20 and 21. If the group of signatures contains a double, i.e., two identical signatures, or for some other reason contains more than the correct number of signatures, idler wheel 21 will move away from driven wheel 20 and lever 50 will rotate in a clockwise direction. Since spring 44a is stiffer than spring 58, there is no possibility of wheel 20 being moved. This motion causes surface 50c on lever to push against spherical surface 55 and rotate lever 53 in a clockwise direction against the bias of spring 60. This will occur as the high portion of cam 65 contacts follower 64 which causes lever 62 and arm 63c to rotate in a counterclockwise direction. However, the motion of lever 62 will be impeded since gauge block 61 will have moved to the left due to the counterclockwise motion of lever 53 which will cause gauge block 61 to abut gauge receptacle 62b (FIG. 6). While lever 62 is no longer able to rotate in a counterclockwise direction, lever 63 continues to be urged in a counterclockwise direction by the contact between the high portion of cam 65 and follower 64 so that spring 67 will become compressed, allowing arm 63c to approach lever 62 and stud 74 to actuate switch 72.

Actuation of switch 72 will in turn energize solenoid 78 causing plunger 77 to move to the right as viewed in FIG. 5. As a result of the next pin on rotating gear 75 that passes adjacent plunger 77, as the gear rotates to bring the pin in contact with the plunger, will be pushed by the plunger to the right of the gear (FIG. 5). Movement of the pin to the right of the gear will in turn sequentially pivot levers 81 about their pivot points 81a as gear 75 rotates and brings the pins in contact with the levers so that button 83 on each side switch 82 will be released sequentially for the period of time the pin is in contact with the switch-operating lever. Continued rotation of gear 75 will bring the pin into contact with inclined block 84 which restores each pin to its normal retracted position so that the major portion of the pin projects to the left of gear 75, as viewed in FIG. 5.

When the signatures have left the space between the calipering wheels and before the pin that was moved to the right by plunger 77 has been restored to its normal position, cam 65 will have rotated to a position so its low portion will be in contact with follower 64 allowing follower 64 and element 63 to rotate in a clockwise direction under the influence of spring 70. This motion causes lever 62 to swing in a counterclockwise direction with spring 67 urging arm 63b away from lever 62. As a result stud 74 no longer actuates switch 72. This motion deenergizes solenoid 78, thus moving plunger 77 to the left as viewed in FIG. 5.

If a group of signatures passing between the calipering wheels contains less than the required number of signatures, idler wheel 21 will move towards wheel 20 under the bias of spring 58 and lever 50 will rotate in a counterclockwise direction until stop 52 hits stop 52a. As a result spring 60 moves lever 53 in a counterclockwise direction, maintaining spherical surface 55 in contact with surface 58. Thus, as element 63 and lever 62 rotate in a clockwise direction as a result of the high portion of cam 65 being in contact with follower 64, gauge block 61 will abut gauge receptacle 62a halting counterclockwise rotation of lever 62. Element 63 will continue its counterclockwise rotation so that stud 74 will continue its counterclockwise rotation so that stud 74 will change the contact conditions within switch 72. This condition actuates the memory mechanism which operates as previously described.

Once the gatherer and binder have been placed in operation, the distance between the driven calipering wheel and the idler calipering wheel can conveniently and rapidly be readjusted to detect the absence of various different predetermined numbers of signatures by moving wheel 40 without having to shut the equipment as is required in the prior art devices.

What is claimed is:

1. Apparatus for detecting the absence of a predetermined number of signatures in a group of signatures when advancing with respect to said apparatus along a predetermined path of travel comprising:

a. a stationary frame;
   b. a driven rotatable calipering element having the periphery thereof adapted to engage one side of a group;
   c. means mounted on said stationary frame for selectively pivoting the rotational axis of said driven calipering element with respect to said stationary frame to position said driven calipering element with respect to one side of the predetermined path of travel;
   d. means for driving said driven rotatable calipering element, said driving means including a shaft thereof coincidental with the pivotal axis of said selective pivoting means to enable the rotational axis of said driven rotatable calipering element to be selectively pivoted without additional adjustment of the driving means;
   e. an idler rotatable calipering element having the periphery thereof adapted to engage the other side of the group, the axis of rotation of each of said driven and idler calipering elements being offset from said predetermined path of travel so that the periphery thereof are substantially tangential to the side of a group when moving therebetween;
   f. additional means mounted on said stationary frame independent of said pivotable means for selectively pivoting the rotational axis of said idler calipering element with respect to said stationary frame to position said idler calipering element with respect to the other side of the predetermined path of travel, said idler calipering element spaced from said driven calipering element with the signatures to be calipered being adapted to pass along the predetermined path of travel between said driven and idler calipering elements and means for resiliently biasing said additional pivoting means toward said pivoting means and into a predetermined position in which the distance between the periphery of said driven calipering element and the periphery of said idler calipering element is less than the thickness of a group of signatures containing the predetermined number of signatures therein, said additional pivoting means for said idler calipering element being moved away from said pivoting means for said driven calipering element and against the bias of said biasing means as a function of the thickness of a group when the group passes between said driven and said idler calipering elements;
   g. means for multiplying the movement of said additional pivoting means; and
   h. means responsive to the movement of said means for multiplying the movement of said additional pivoting means for producing a signal whenever a group having a number of signatures different than the predetermined number of signatures passes between said driven and idler calipering elements.

2. Apparatus in accordance with claim 1 in which said means for selectively pivoting the rotational axis of said driven calipering element with respect to said stationary frame to position said driven calipering element with respect to one side of the predetermined path of travel and said additional means for selectively pivoting the rotational axis of said idler calipering element with respect to said stationary frame to position said idler calipering element with respect to the other side of the predetermined path of travel each have a pivotal axis substantially parallel to the path of travel of the group.

3. Apparatus according to claim 1 further including:

a. drive means for said apparatus, said drive means for advancing the signatures to be calipered along the path to a position between said calipering elements and then away from said calipering elements;

b. said means for multiplying movement of said additional pivoting means including linkage means connected to said idler calipering element for amplifying movement of said idler calipering element relative to said driven calipering element in a plane substantially perpendicular to the plane the signatures will be in when being calipered;

c. a measuring device;

d. means in synchronization with said drive means for moving said measuring device toward said linkage means upon the arrival of the signatures to be calipered between said calipering elements and for moving said measuring device away from said linkage means subsequent to the previously mentioned signatures passing between said calipering elements.

4. Apparatus according to claim 3 wherein a gauge block is located on a portion of said linkage means, said measuring device including a pair of gauge receptacles with said gauge receptacles movable towards the portion of said linkage means where said gauge block is located when the signatures are being calipered, said gauge receptacles flanking said gauge block as said gauge receptacles are moved towards said gauge block when the predetermined number of signatures is passing between said driven and idler calipering elements, said gauge block interfering with movement of said gauge receptacles towards said gauge block when a number different than the predetermined number of signatures is passing between said driven and idler calipering elements.

5. Apparatus according to claim 1 further including:

a. drive means for said apparatus, said drive means for advancing the signatures to be calipered along the path to a position between said calipering elements and then away from said calipering elements;

b. said means for multiplying movement of said additional pivoting means including linkage means connected to said idler calipering element for amplifying movement of said idler calipering element relative to said driven calipering element;

c. a measuring device;

d. means in synchronization with said drive means for moving said measuring device toward said linkage means upon the arrival of the signatures to be calipered between said calipering elements and for moving said measuring device away from said linkage means subsequent to the previously mentioned signatures passing between said calipering elements.

6. Apparatus according to claim 5 further including:

a. switch-actuating means movable with said measuring device;

b. abutment means on said linkage means;

c. said means for producing a signal including switch means capable of moving relative to said measuring device and with said measuring device; and d. means moved in synchronization with said drive means for moving said switch means toward said switch-actuating means upon the arrival of signatures between said calipering elements and away from said switch-actuating means upon the previously mentioned signatures leaving said calipering element, whereby said switch means will move relative to said switch-actuating means upon a different number of signatures being calipered than the predetermined number due to said abutment means on said linkage means halting movement of said measuring device towards said linkage means upon said linkage means amplifying movement of said idler calipering element relative to said driven calipering element so said switch-actuating means will actuate said switch means whereas when the predetermined number of signatures are being calipered said switch means and said switch-actuating means will move in unison and said switch means will not be actuated.

7. Apparatus according to claim 6 further defined by:

a. said linkage means including a first lever connected to said idler calipering element and pivotable about said stationary frame, a second lever pivotable about said stationary frame with said abutment means being located on said second lever and means for biasing said second lever in contact with said first lever so that movement of said first lever and said idler calipering element will result in amplified movement of a portion of said second lever;

b. a third lever pivotable with respect to said stationary frame and movable in synchronization with said drive means towards said second lever upon the arrival of signatures between said calipering elements and away from said second lever subsequent to the signatures leaving said calipering elements; and c. said switch-actuating means and said measuring device being supported by said third lever.

8. Apparatus according to claim 7 wherein said second lever is biased into contact with said first lever adjacent said idler calipering element.

9. Apparatus according to claim 7 further including a fourth lever pivotable with respect to said stationary frame, said switch means being mounted on said fourth lever, means to bias third and fourth lever away from each other, means for limiting movement of said third lever away from said fourth lever and vice versa, and means in synchronization with said drive means for moving said fourth lever toward said third lever as the signatures arrive between said calipering elements to be calipered and away from said third lever upon the signatures leaving said calipering elements.

10. Apparatus according to claim 9 further defined by means fixed relative to said stationary frame for biasing said fourth lever away from said third lever.

11. Apparatus according to claim 10 wherein said means for moving said third lever toward said fourth lever when signatures arrive between said calipering elements and said fourth lever away from said third lever when the signatures leave the calipering elements includes cam means rotated in synchronization with said drive means and a follower located on said fourth lever for following the contour of said cam means.

12. Apparatus according to claim 11 wherein said fourth lever includes three mutually joined arms, a first of said arms being pivotable with respect to said stationary frame, a second of said arms including said follower at one end and said switch means being located on a third of said arms.

13. Apparatus according to claim 6 further defined by a memory device having at least one memory element capable of being in a first or second position, and electrically actuated means responsive to said switch means being actuated for moving at least one memory element from a first to a second position, said memory device including a rotatable structure rotatable in synchronization with said drive means, and said electrically actuated means including solenoid means energizable by said switch means being actuated, whereby when said solenoid means are energized and upon a predetermined amount of rotation of said rotatable structure at least one memory element will move from the first to the second position.

14. Apparatus according to claim 13 wherein said solenoid means include a plunger movable from a first to a second position upon said solenoid being energized, said plunger being located with respect to said rotatable structure so that when said plunger is in said second position rotation of said rotatable structure a predetermined amount will cause a memory element of said rotatable structure to abut said plunger so that the element will be in the second position.

15. Apparatus according to claim 14 further defined by signal-producing means for producing a signal upon at least one memory element being in second position and after a predetermined amount of rotation of said rotatable structure.

16. Apparatus according to claim 15 further defined by a member fixed relative to said stationary frame and adjacent to said rotatable structure, said signal-producing means located on said fixed member, whereby said signal-producing means will produce a signal upon said memory element being in the second position when said rotatable structure is rotated so said memory element thereon in the second position is at a predetermined location with respect to said signal-producing means on said fixed member.

17. Apparatus according to claim 16 wherein said signal-producing means are defined by a switch and lever arrangement located on said fixed member in relation to said rotatable structure so that when said memory element is in said second position as a result of said solenoid being energized said memory element will abut said lever to actuate said switch on said fixed member as said rotatable structure rotates a predetermined amount.

18. Apparatus according to claim 1 further including:
   a. means for biasing said first pivotable means towards said additional pivoting means and toward one side of the predetermined path, said biasing means for said first pivotable means being stronger than said means to resiliently bias said additional pivoting means whereby when a number greater than the predetermined number of signatures are being calipered between said calipering elements said idler calipering element will always move relative to said stationary frame in preference to said driven calipering element moving relative to said stationary frame; and
   b. means for selectively limiting movement of said driven calipering element on said first pivotable means towards said idler calipering element on said additional pivoting means.

19. Apparatus according to claim 18 wherein means are provided for selectively limiting movement of said idler calipering element toward said driven calipering element.

20. Apparatus according to claim 19 wherein said means for selectively limiting movement of said idler calipering element towards said driven calipering element includes stop means adjustably fixed relative to said idler calipering wheel, abutment means fixed relative to said stationary frame in a position so that as said idler calipering element moves towards said driven calipering element a predetermined amount said stop means will hit said abutment means halting movement of said idler calipering element towards said driven calipering element.

21. Apparatus according to claim 1 wherein said means for selectively pivoting the rotational axis of said driven calipering element includes support means pivotally mounted on said stationary frame, said support means and said driven calipering element movable in unison with each other, a threaded element having a free end, said free end of said threaded element being held fixed from movement toward or away from said stationary frame, said support means threadedly connected with said threaded element wherein said support means and said driven calipering element are movable with respect to said threaded element to pivotably vary said driven calipering element axis of rotation upon rotation of said threaded element.

22. A calipering method for detecting the absence of a predetermined number of signatures in a group of signatures including the steps of:
   a. advancing the group of signatures in a path of travel along one side of a support surface having an aperture therein;
   b. pivoting a driven calipering element disposed on tee one side of the support surface relative to the support surface and independently of any movement of an idler calipering element disposed on the other side of the support surface to set a distance between the idler calipering element and the driven calipering element corresponding to the thickness of the predetermined signatures;
   c. passing the signatures between the idler calipering element and the driven calipering element and biasing the idler calipering element into the aperture of the support surface;
   d. moving the idler calipering element in a vertical plane substantially perpendicular to the path of travel of the signatures in response to the thickness of the signatures passing between the calipering elements;
   e. amplifying movement of the idler calipering element in a vertical plane substantially perpendicular to the path and positioning a block of a predetermined size in accordance with the amplifying movement of the idler calipering element and in the plane of the amplifying movement when a group of signatures are between the calipering elements for departure from a predetermined point corresponding to the position of the block when the predetermined number of signatures are between the calipering elements;
   f. moving gauge block receptacles in the vertical plane the gauge block is moved in towards the block when a group of signatures are between the calipering elements;
   g. abutting the gauge block receptacles with the gauge block as a result of the amplifying movement of the idler calipering element when a number of signatures different than the predetermined number are between the calipering elements and flanking the gauge block with the gauge receptacles when the predetermined number of signatures are between the calipering elements;
   h. producing a signal upon abutting the gauge receptacles with the gauge block; and
   i. moving the gauge block receptacles away from the gauge block while moving the signatures away from the calipering elements.

23. A method according to claim 22 including the step of moving the idler calipering element in to the aperture to set the projection of the idler calipering element above the one side of the support surface.

24. Apparatus for detecting the absence of a predetermined number of signatures in a group of signatures when advancing with respect to said apparatus along a predetermined path of travel comprising:
   a. a stationary frame;
   b. a driven rotatable calipering element having the periphery thereof adapted to engage one side of a group;
   c. means mounted on said stationary frame for selectively pivoting the rotational axis of said driven calipering element with respect to said stationary frame to position said driven calipering element with respect to one side of the predetermined path of travel;
   d. an idler rotatable calipering element having the periphery thereof adapted to engage the other side of the group, the axis of rotation of each of said driven and idler calipering elements being offset from said predetermined path of travel so that the periphery thereof are substantially tangential to the side of a group when moving therebetween;
   e. additional means mounted on said stationary frame independent of said pivotable means for selectively pivoting the rotational axis of said idler calipering element with respect to said stationary frame to position said idler calipering element with respect to the other side of the predetermined path of travel, said idler calipering element spaced from said driven calipering element with the signatures to be calipered being adapted to pass along the predetermined path of travel between said driven and idler calipering elements and means for resiliently biasing said additional pivoting means toward said pivoting means and into a predetermined position in which the distance between the periphery of said driven calipering element and the periphery of said idler calipering element is less than the thickness of a group of signatures containing the predetermined number of signatures therein, said additional pivoting means for said idler calipering element being moved away from said pivoting means for said driven calipering element and against the bias of said baising means as a function of the thickness of a group when the group passes between said driven and said idler calipering elements;

f. drive means for said apparatus, said drive means for advancing the signatures to be calipered along the path to a position between said calipering elements and then away from said calipering elements;

g. means for multiplying the movement of said additional pivoting means including linkage means connected to said idler calipering element for amplifying movement of said idler calipering element relative to said driven calipering element;

h. abutment means on said linkage means;

i. means responsive to the movement of said means for multiplying the movement of said additional pivoting means for producing a signal whenever a group having a number of signatures different than the predetermined number of signatures passes between said driven and idler calipering elements, said means for producing a signal including a measuring device and a switch means capable of moving relative to said measuring device;

j. means in synchronization with said drive means for moving said measuring device toward said linkage means upon the arrival of the signatures to be calipered between said calipering elements and for moving said measuring device away from said linkage means subsequent to the previously mentioned signatures passing between said calipering elements;

k. means moved in synchronization with said drive means for moving said switch means toward said switch-actuating means upon the arrival of signatures between said calipering elements and away from said switch-actuating means upon the previously mentioned signatures leaving said calipering elements, whereby said switch means will move relative to said switch-actuating means upon a different number of signatures being calipered than the predetermined number due to said abutment means on said linkage means halting movement of said measuring device towards said linkage means upon said linkage means amplifying movement of said idler calipering element relative to said driven calipering element so said switch actuating means will actuate said switch means whereas when the predetermined number of signatures are being calipered said switch means and said switch-actuating means will move in unison and said switch means will not be actuated; and l. a memory device having at least one memory element capable of being in a first or second position, and electrically actuated means responsive to said switch means being actuated for moving at least one memory element from a first to a second position, said memory device including a rotatable structure rotatable in synchronization with said drive means, and said electrically actuated means including solenoid means energizable by said switch means being actuated, whereby when said solenoid means are energized and upon a predetermined amount of rotation of said rotatable structure at least one memory element will move from the first to the second position, said solenoid means including a plunger movable from a first to a second position upon said solenoid being energized, said plunger being located with respect to said rotatable structure so that when said plunger is in said second position rotation of said rotatable structure a predetermined amount will cause a memory element of said rotatable structure to abut said plunger so that the element will be in the second position.

25. Apparatus according to claim 24 further defined by signal-producing means for producing a signal upon at least one memory element being in second position and after a predetermined amount of rotation of said rotatable structure.

26. Apparatus according to claim 25 further defined by a member fixed relative to said stationary frame and adjacent to said rotatable structure, said signal-producing means located on said fixed member, whereby said signal producing means will produce a signal upon said memory element being in the second position when said rotatable structure is rotated so said memory element thereon in the second position is at a predetermined location with respect to said signal producing means on said fixed member.

27. Apparatus according to claim 26 wherein said signal-producing means are defined by a switch and lever arrangement located on said fixed member in relation to said rotatable structure so that when said memory element is in said second position as a result of said solenoid being energized said memory element will abut said lever to actuate said switch on said fixed member as said rotatable structure rotates a predetermined amount.

* * * * *